Oct. 19, 1965

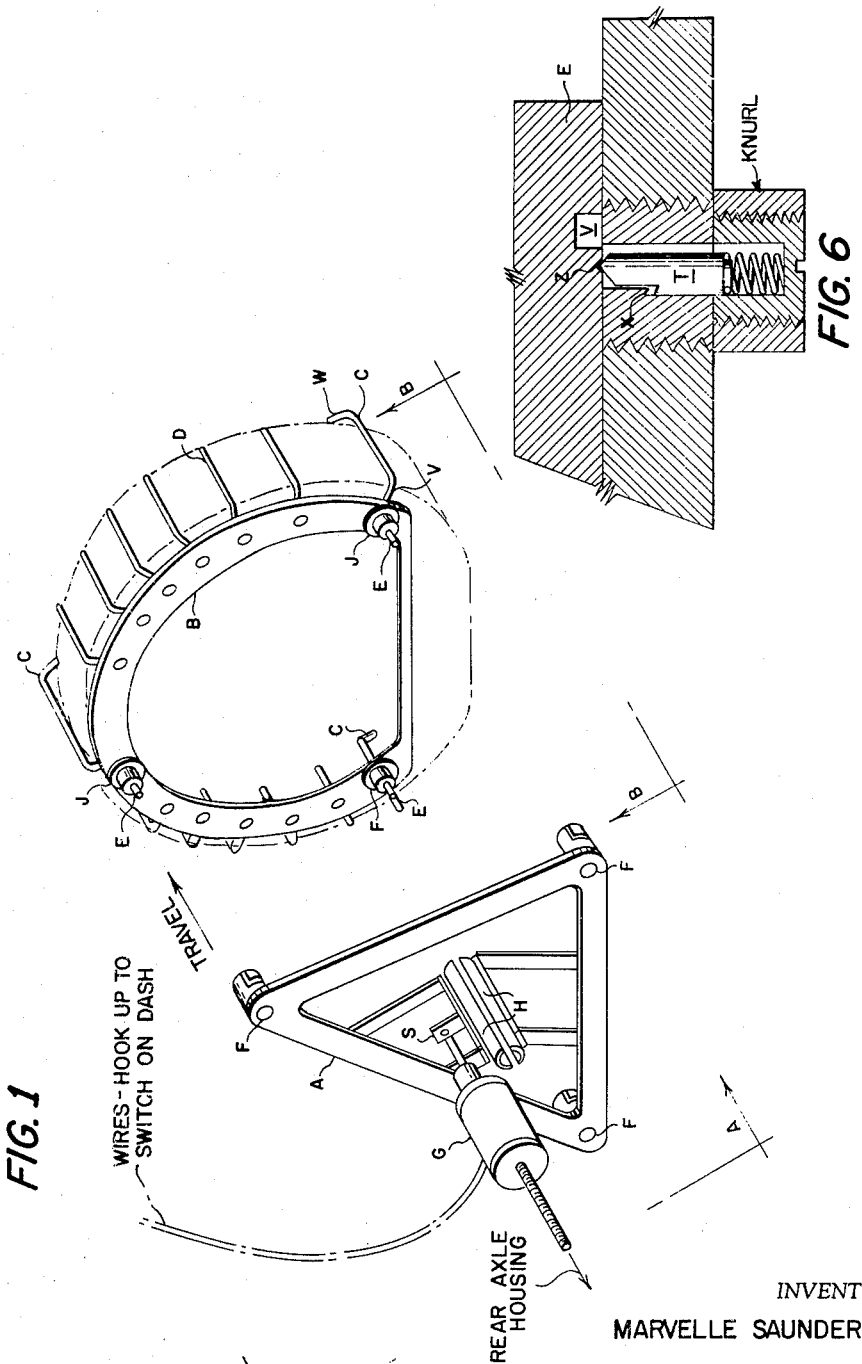

M. SAUNDERS 3,212,550

AUTOMATIC ANTI-SKID DEVICE

Filed April 21, 1964

3 Sheets-Sheet 2

INVENTOR
MARVELLE SAUNDERS

BY *Larson and Taylor*

ATTORNEYS

INVENTOR
MARVELLE SAUNDERS

United States Patent Office 3,212,550
Patented Oct. 19, 1965

3,212,550
AUTOMATIC ANTI-SKID DEVICE
Marvelle Saunders, 2563 S. Stewart, Springfield, Mo.
Filed Apr. 21, 1964, Ser. No. 361,439
6 Claims. (Cl. 152—214)

My invention relates generally to anti-skid devices and more particularly to an anti-skid device which is capable of being installed automatically by closing an electrical circuit without the necessity of jacking the wheels off the ground.

Anti-skid devices are generally of two types: those utilizing chains, and those utilizing anti-skid bars placed in fixed position across the tire tread. In the past, the chain devices have been held in position by means of stretchable members fastened to various points along the edge of the chain tread so as to apply tension, thereby drawing the chain tightly across the tire tread. The anti-skid bar devices have consisted of metal frames having the bars rigidly attached thereto, such frames being secured to the rim of the tire or being bolted onto the tire in some fashion.

The principal difficulty with such devices has been the necessity of installing them by hand and the nuisance of removing and reinstalling many times during the winter months, according to the demand. Therefore, in addition to these inconveniences suffered, it has been necessary to carry such devices in the vehicle at all times for use in an emergency.

An object of this invention is to provide an anti-skid device which may be automatically installed or removed by the closure of an electrical circuit.

A further object is to provide an anti-skid device which may be permanently installed underneath the vehicle for use on snow, ice or mud.

Another object is to provide an anti-skid device which may be readily installed in an emergency, which may be removed at will, and which does not require storage in the vehicle nor bothersome manual installation.

Other objects and advantages of the invention will be apparent during the course of the following description.

Figure 3:
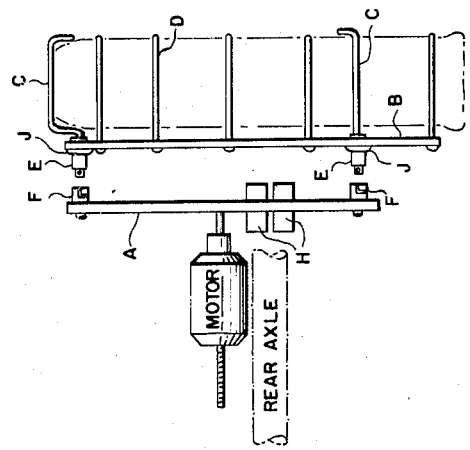
Figure 5:
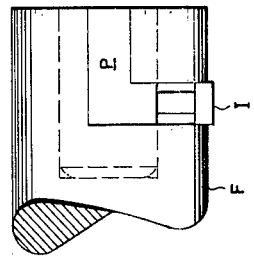
Figure 2:
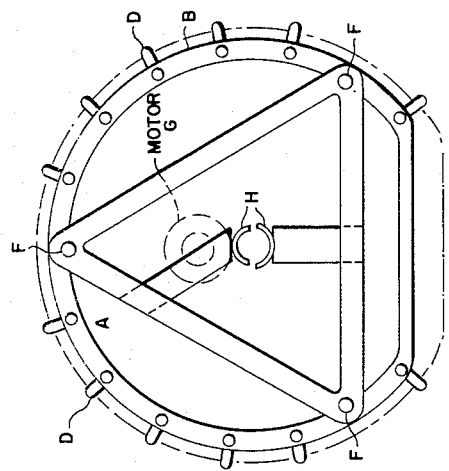
Figure 4:
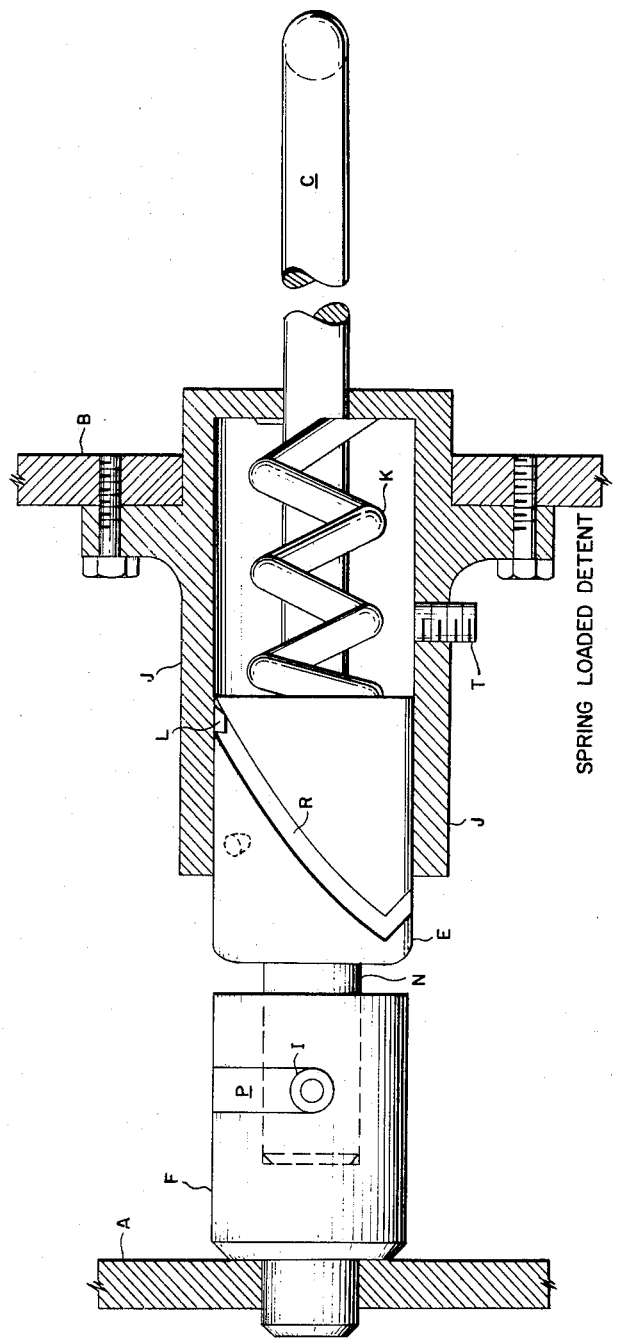

In the accompanying drawings, forming a part of this specification, and in which like letters are employed to designate like parts throughout the several views, FIG. 1 is an exploded perspective view of an embodiment of my invention, FIG. 2 is an end view thereof, FIG. 3 is an exploded side view, FIG. 4 is a side sectional view of a locking mechanism, FIG. 5 is a partial top view of the locking mechanism of FIG. 4, and FIG. 6 is an enlarged sectional view of a detent mechanism of FIG. 4.

A preferred embodiment of my invention, illustrated in FIGS. 1–6 inclusive, comprises a mounting frame A and the anti-skid frame B. Rigidly mounted to the frame B are several anti-skid bars D extending across the tire tread. In addition, U-shaped grip bars C are provided which rotate on installation of the anti-skid device to grip against the side of the tire, thus holding the anti-skid frame B against the tire upon retraction of the mounting frame A. The mounting frame A is provided with mounting lugs F, made to engage with cylindrical cam studs E in at least three locations for locking frames A and B together and for turning of the grip bars C. A direct current motor G is rigidly mounted to the axle housing and has a threaded shaft to allow lateral motion of the mounting frame A along a guideway on the axle housing or along the axle housing itself. The mounting frame A is provided with bushings H for this purpose. The threaded shaft of the motor G is engaged with a threaded hole in the member S, rigidly fixed to the frame A. The direction of travel of the mounting frame depends upon the polarity of the input to the motor, which is controlled by switches inside the vehicle.

The principle of operation may most readily be described with reference to FIGS. 3, 4 and 5. As a matter of explanation, there is mounted beneath the vehicle a separate complete installation for each of the two rear wheels, each device being independently actuated or installed by means of separate switches inside the vehicle, but the principle of operation will be described with reference to one of the devices. In the retracted position, the two frames A and B are locked together by means of roller pins I rigidly mounted to the shafts N of the cam studs E. The roller pins are bottomed out in the circumferential legs of the L-shaped grooves P of the tubular members F rigidly mounted to the frame A, the members F each having a hole in the end thereof to receive a shaft N. The tension of the coil spring K is sufficient to hold the roller pins I in position. The anti-skid frame B is therefore held against the mounting frame A at three points. Each of the three cam studs E is rigidly attached to a U-shaped grip bar C. The attachment is made by means of a rod perpendicular to the inside limb V of the U-shaped grip bar. The limbs W, shorter in length than limbs V, are in an "up" position when the anti-skid frame is retracted, or are in such a position as not to strike against the inside surface of the tire upon assembly.

The cam studs E, as shown in FIG. 4, are each provided with a keyway R extending diagonally over approximately one quarter of the surface area. The cam studs are guided in housings J, rigidly fixed to the frame B. Protruding from the inside of each housing J, is a button-like key L which is positioned in the groove R. Pressure on the shaft N will therefore cause the cam stud E to rotate corresponding to the relative movement of the key L through the keyway R. A coiled tension spring K is provided between each cam stud E and the rear of its respective housing J and is under tension at all times. A detent T, shown in FIG. 6, is provided within each housing J to hold each cam stud in its desirable position when the pressure on the shaft N is released. Relating FIG. 6 to FIG. 4, cam stud E moves within housing J until spring-loaded detent T pops up into opening V, to lock mounting frame A and anti-skid frame B together. The pressure on shaft N is then released. FIG. 6 shows the relative positions of cam stud E and detent when pressure is again applied to shaft N and cam stud E upon removal of the mounting frame A from anti-skid frame B. Cam stud E, as shown in FIG. 6, moves from left to right within housing J. The trailing edge of opening V has pushed detent T downward to allow cam stud E to ride over the top of detent T. When the mounting frame A is backed off, notch Z pulls detent T to the left so that detent T is adjacent notch X within the detent housing. Cam stud E moves from right to left, and due to the sloping top portion of detent T, and the restricted travel of detent T while it is in the extreme left position, detent T will move in and out of opening V as cam stud E is backed out of housing J.

In the installation of the device, the mounting frame A with the anti-skid frame B attached is in the retracted position. Upon actuation of the motor G, the assembly moves forward, and the bars C and D slip over the edge of the tire. As the frame B hits the inside of the tire, the housings J become stationary, and the continued turning of the motor shaft applies pressure on the shafts N. The pressure causes the cam studs E to rotate corresponding to the relative movement of the keys L in the keyways R, which results in the inward motion of the cam studs E toward the rear of the housings J. Upon rotation of the cam studs E, the roller pins I move along the circumferential legs of the L-shaped slots in the mounting lugs F until they are positioned at the intersection of the longitudinal and circumferential legs of the L-shaped slots, at which point the cam studs E are locked in position by the detents T, and the motor G is turned off either by means of a limit switch or by manual operation of a switch. The cam studs E have thereby rotated, within the housings J, approximately 90 deg., and the U-shaped grip bars C have consequently rotated such that their outside limbs W are positioned over the outside edge of the tire. The polarity of the motor G is then reversed by means of a switch, and the mounting frame A is backed off from the anti-skid frame B and is stored underneath the vehicle.

Upon removal of the apparatus from the tire, the anti-skid frame B is aligned with the mounting frame A by lining up a mark on the frame B with a reference mark on the vehicle. The motor G is then actuated, bringing the mounting frame A in contact with the anti-skid frame B. The shafts N of the cam studs E are received in the tubular mounting lugs F, and butt against the end of the receiving hole. Further rotation of the motor shaft causes pressure to be applied to the shaft N. Such pressure releases the detents T from openings V in cam stud E (FIG. 6), and the motor G is then stopped. Reversal of the motor will cause the mounting lugs F to back away from the housings J; however, as the pressure on the shafts N is released, the cam studs E will rotate due to the tension of the springs K. The roller pins I will thereby be rotated in the circumferential leg of the L-shaped slots P, and the anti-skid frame B will be locked to the mounting frame A. Rotation of the cam studs E has caused the grip bars C to rotate, and the assembly is consequently removed from the tire. The process of removal is followed independently for each tire.

It will be apparent to one skilled in the art that many modifications of the disclosed embodiment of this invention may be made without departing from the spirit and scope of the appended claims.

What I claim is:

1. An anti-skid device for vehicle wheels comprising a rigid first frame, said frame being mounted against a first side of a tire when said anti-skid device is installed, finger-like first bars for engaging with the tread of said tire in spaced relationship across the tread and each rigidly attached at one end to said first frame, said first bars extending in a ring around the periphery of said tire and having a space between two of them at least as wide as the length of the contact area of said wire with the ground when the vehicle is at rest, said space enabling said anti-skid device to be installed without raising said tire from the ground, at least three second bars extending across the tread of said tire and distributed in spaced relationship along the periphery of said tire, said second bars being supported at one end by said first frame and extending over a second side of said tire to hold said first frame against said first side of said tire, a rigid second frame, means for locking said second frame against said first frame, guide means attached to said second frame, said guide means cooperating with a guide member perpendicular to the plane of said tire, and means for moving said second frame along said guide member toward and away from said tire.

2. An anti-skid device according to claim 1 wherein said guide member is mounted on a vehicle axle housing and said guide means comprises bronze bushings which engage with and slide along said guide member and said guide means is centrally located within said second frame, and wherein said means for moving said second frame along said guide member is a motor rigidly mounted on said axle housing and having a threaded shaft, and wherein said anti-skid device comprises further a rigid member fixed to said second frame and having a threaded hole therein for engaging said threaded shaft.

3. An anti-skid device according to claim 1 wherein said second bars are U-shaped and are rotatably mounted to said first frame by means of rods rigidly attached at right angles to the ends of first limbs of said U-shaped second bars and extending through said first frame, the U-channel of said U-shaped second bars being at least large enough to receive the tread of said tire when the anti-skid device is installed, and the U-shaped second bars having first and second limbs, said first limb extending against said first side of said tire when the anti-skid device is installed and said second limb extending against said second side and being shorter in length than said first limb.

4. An anti-skid device according to claim 2 wherein said means for locking together said first and second frames comprises at least three first cylindrical members, each of said first cylindrical members having one of said second bars rigidly attached to its base, the attachment being to those ends of said second bars which extend through said first frame such that the longitudinal axes of both first cylindrical members and second bars are coincident and parallel, and said first cylindrical members being rotatable with said second bars and having on each a keyway extending diagonally across about one-quarter of its curved surface area, tubular housings, one end of each of said tubular housings rigidly attached to said first frame for engaging each of said first cylindrical members, each of said tubular housings having attached to its inside a button-like key engaging with said keyway on one of said first cylindrically members, thereby causing said first cylindrical members to rotate and travel toward said first frame when pressure is applied to their ends and causing a consequential rotation of said second bars, spring means within each of said housings applying tension outwardly from said first frame to the ends of said first cylindrical members, detent means in each of said housing members for automatically locking said first cylindrical members in their desired positions after they have been rotated inwardly toward said first frame, said detents holding said first cylindrical members in position upon removal of the pressure necessary for rotation of said first cylindrical members, and said detents being released upon the reapplication of said pressure, shaft members relatively short in length and each rigidly attached to the end opposite said second bar on said cylindrical members, each of said shaft members having a roller pin rigidly attached to its side thereof, at least three of second cylindrical members rigidly attached to said second frame and each having a hole in the end thereof, said second cylindrical members positioned on said second frame in such a manner as to cooperate with said shaft members, said holes being sufficiently large to receive said shaft members and to allow turning of said shaft members therein, and each of said second cylindrical members having an L-shaped groove with a longitudinal leg extending from the edge of the end containing said hole along part of the length of respective second cylindrical member and a circumferential leg extending over about one-quarter of the circumference of said second cylindrical member, said L-shaped groove extending from the outside of said second cylindrical member through the surface surrounding said hole and sufficiently large to engage one of said roller pins, thereby causing said first frame to become locked to said second frame by virtue of the tension on said spring means when said roller pins are positioned in the ends of the circumferential legs of said L-shaped grooves.

5. An anti-skid device according to claim 4 wherein each of said L-shaped grooves is positioned such that the turning of said first cylindrical members due to pressure exerted on them will cause said roller pins to travel along said circumferential legs to the junction of said circumferential legs and longitudinal legs and wherein the locking by said detents of said first cylindrical members in position will allow said first frame to be removed from said second frame, said roller pins leaving said second cylindrical members by means of said longitudinal legs.

6. An anti-skid device according to claim 4, wherein said second frame is in the shape of an equilateral triangle having one of said second cylindrical members located at each apex, and wherein said first frame is of a circular shape having a section of its circumference removed sufficiently large to allow for the length of the contact area of the tire and the ground when the vehicle is not in motion, and wherein said first cylindrical members are equally spaced apart, each cooperating with one of said second cylindrical members.

References Cited by the Examiner

UNITED STATES PATENTS 2,720,237  10/55  Chamberlain _____ 152—214
2,838,086   6/58  Feeney _____ 152—214

ARTHUR L. LA POINT, *Primary Examiner.*

UNITED STATES PATENT OFFICE
CERTIFICATE OF CORRECTION

Patent No. 3,212,550

October 19, 1965

Marvelle Saunders

It is hereby certified that error appears in the above numbered patent requiring correction and that the said Letters Patent should read as corrected below.

In the heading to the printed specification, line 3, for "2563 S. Stewart" read -- 2653 S. Stewart --.

Signed and sealed this 12th day of July 1966.

SEAL)
ttest:

RNEST W. SWIDER
ttesting Officer

EDWARD J. BRENNER
Commissioner of Patents